US011509468B2

(12) United States Patent
Rothschild et al.

(10) Patent No.: US 11,509,468 B2
(45) Date of Patent: Nov. 22, 2022

(54) METHOD AND SYSTEM FOR VERIFYING SECRET DECRYPTION CAPABILITY OF ESCROW AGENTS

(71) Applicant: EMC IP Holding Company LLC, Hopkinton, MA (US)

(72) Inventors: Seth Jacob Rothschild, Littleton, MA (US); Radia Joy Perlman, Redmond, WA (US); Alex Robbins, Mansfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 150 days.

(21) Appl. No.: 17/160,680

(22) Filed: Jan. 28, 2021

(65) Prior Publication Data
US 2022/0239504 A1   Jul. 28, 2022

(51) Int. Cl.
*H04L 9/08*    (2006.01)
*H04L 9/32*    (2006.01)
*H04L 9/40*    (2022.01)
*H04L 9/30*    (2006.01)

(52) U.S. Cl.
CPC ............ *H04L 9/0894* (2013.01); *H04L 9/30* (2013.01); *H04L 9/3271* (2013.01); *H04L 63/0442* (2013.01); *H04L 63/126* (2013.01)

(58) Field of Classification Search
CPC .................................................. H04L 9/0894
See application file for complete search history.

(56) References Cited

U.S. PATENT DOCUMENTS

| 2002/0067833 | A1* | 6/2002 | Han | G06F 21/125 380/280 |
| 2008/0005030 | A1* | 1/2008 | Schlarb | H04L 9/0894 705/57 |
| 2010/0266132 | A1* | 10/2010 | Bablani | H04W 12/128 380/286 |
| 2011/0093721 | A1* | 4/2011 | Perlman | G06F 21/602 713/189 |

* cited by examiner

*Primary Examiner* — Bradley W Holder
(74) *Attorney, Agent, or Firm* — Chamberlain, Hrdlicka, White, Williams & Aughtry

(57) ABSTRACT

A method for verifying a secret decryption of an escrow agent by a client operatively connected to the escrow agent includes initiating enrollment of the client with the escrow agent, wherein the enrollment results the escrow agent generating a key pair comprising a public key and a private key, obtaining the public key from the escrow agent, wherein the private key is not shared with the client, encrypting the secret with the public key to obtain an encrypted secret, after encrypting the secret, encrypting, based on a verification trigger, a verification value using the public key to obtain an encrypted verification value, sending the encrypted verification value to the escrow agent, obtaining a secret decryption response from the escrow agent, making a determination, based on the secret decryption response, that the escrow agent is not capable of decrypting the secret, and based on the determination, performing a remediation action.

20 Claims, 9 Drawing Sheets

METHOD AND SYSTEM FOR VERIFYING SECRET DECRYPTION CAPABILITY OF ESCROW AGENTS

BACKGROUND

Computing devices may include any number of internal components such as processors, memory, and persistent storage. Data sent between computing devices may be subject to undesired exposure to additional computing devices. Computing devices may implement security measures in an attempt to reduce the undesired exposure.

SUMMARY

In general, in one aspect, the invention relates to a method for verifying a secret decryption of an escrow agent by a client operatively connected to the escrow agent. The method includes initiating enrollment of the client with the escrow agent, wherein the enrollment results the escrow agent generating a key pair comprising a public key and a private key, obtaining the public key from the escrow agent, wherein the private key is not shared with the client, encrypting the secret with the public key to obtain an encrypted secret, after encrypting the secret, encrypting, based on a verification trigger, a verification value using the public key to obtain an encrypted verification value, sending the encrypted verification value to the escrow agent, obtaining a secret decryption response from the escrow agent, making a determination, based on the secret decryption response, whether the escrow agent is capable of decrypting the secret, and based on the determination, performing a remediation action.

In general, in one aspect, the invention relates to a method for verifying a secret decryption of an escrow agent by a client operatively connected to the escrow agent. The method includes initiating enrollment of the client with the escrow agent, wherein the enrollment results the escrow agent and the client establishing a base value (g) and prime modulus value (p), and wherein the escrow agent generates a private number (B_C) that is associated with the client but is not accessible to the client, obtaining a public key from the escrow agent, wherein the public key is derived from g, p, and B_C, generating an encryption key using the public key and a private random number A, wherein A is not accessible to the escrow agent, encrypting the secret using the encryption key to obtain an encrypted secret, and storing the encrypted secret and the public key, after storing the public key, encrypting, based on a verification trigger, a verification value using the public key to obtain an encrypted verification value, sending the encrypted verification value to the escrow agent, obtaining a secret decryption response from the escrow agent, making a determination, based on the secret decryption response, that the escrow agent is not capable of decrypting the secret, and based on the determination, performing a remediation action.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
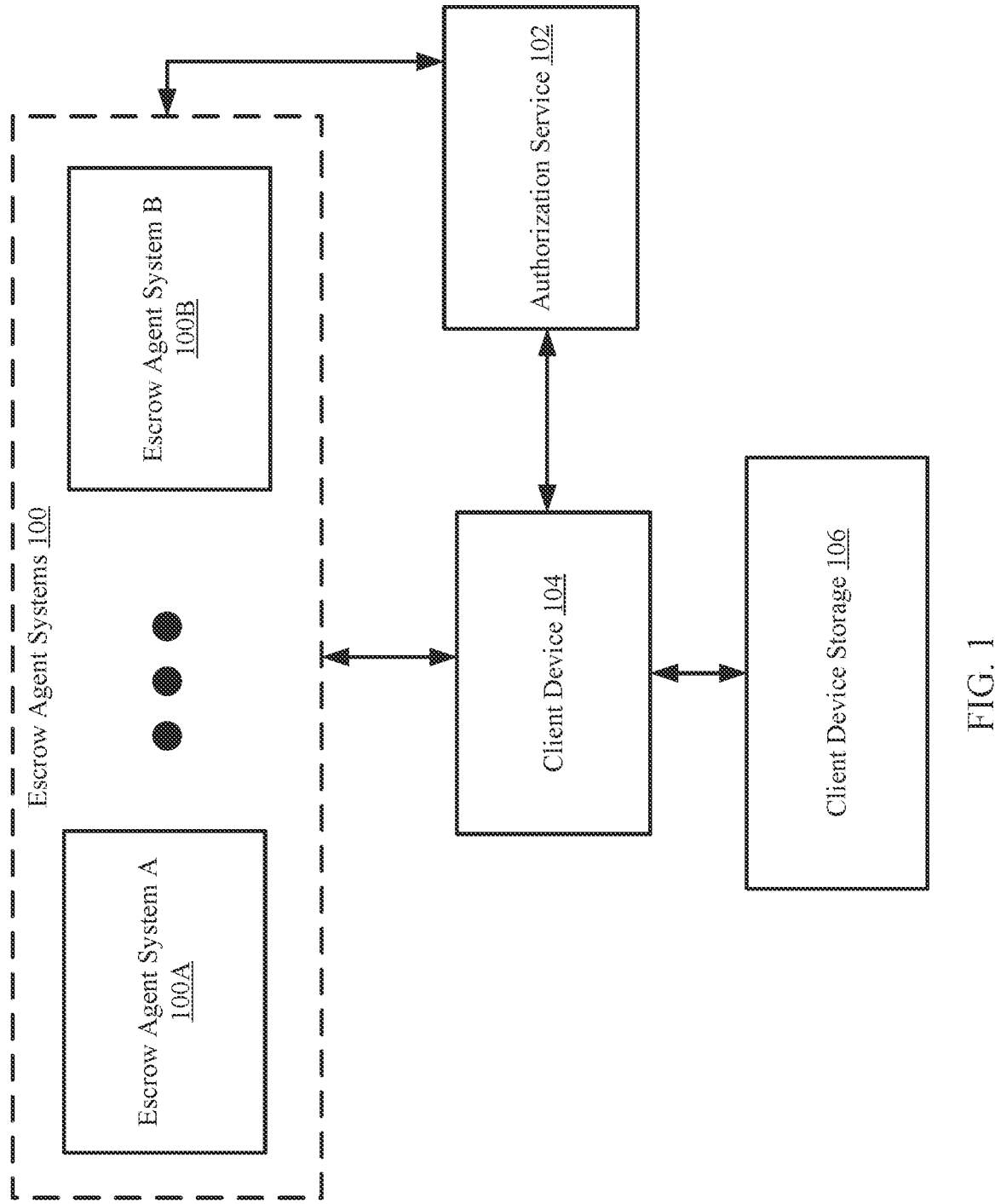
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing encrypted data. The data may be encrypted using a system of escrow agents, a client, and a client storage. The client may store an encrypted version of the data (also referred to as an encrypted secret) generated using a public key provided by one or more of the escrow agents. Further, decrypting the encrypted secret may require the use of the escrow agent(s) that stores a private key inaccessible to the client. In order to prevent the escrow agent(s) from obtaining the secret, a blinding operation may be performed on the encrypted secret prior to providing it to the escrow agent(s). The blinding operation may be undone only by the client device. In this manner, the secret, both decrypted and unblinded, may only be accessed with the use of both the client device and the escrow agents in the system.

The following is a non-limiting example describing one or more embodiments of the invention. Turning to the example, consider a scenario in which a client device sends a secret encryption initiation request to an escrow agent. The secret encryption initiation request specifies initiating an encryption on a secret to be stored in a storage accessible only to the client device. The escrow agent may initiate a generation of a pairing entry that includes a public key and a private key. The escrow agent may respond with the public key. The client device may encrypt the secret using the provided public key and store the encrypted key in the client storage. The public key may not be used to decrypt the encrypted secret. At a later point in time, the client desires to access a decrypted version of the secret. The client device performs a blinding operation using at least a portion of values known only to the client device. The client device then sends a secret decryption request to the escrow agent that includes the blinded, encrypted secret. After verifying the authenticity of the client device using an authorization service, the escrow agent may use the private key to perform the decryption and obtain the decrypted blinded secret. The decrypted blinded secret is returned to the client device. The client device may then perform an unblinding operation to the blinded decrypted secret to obtain the desired unblinded, decrypted secret.

Embodiments of the invention relate to a method for verifying the capability of the escrow agents by performing verification tests on each of the escrow agents. The verification tests may be periodic and/or asynchronous. Each verification test may include, for example, sending encrypted verification value, encrypted using a corresponding obtained public key, and requesting for the escrow agent to decrypt the encrypted verification value using a corresponding private key. If the escrow agent is still in possession of the private key, the decryption may be performed, and the escrow agent may respond with the decrypted verification value. If the decryption may not be performed, the client device may perform a remediation action to remediate the lack of capability of the escrow agent.

FIG. 1 shows a diagram of a system in accordance with one or more embodiments of the invention. The system includes an authorization service (102), one or more escrow agent systems (100), a client device (104), and a client device storage (106) accessible only to the client device (104). Each component of the system may be operably connected via any combination of wired and/or wireless connections. Each component of the system illustrated in FIG. 1 is discussed below.

In one or more embodiments of the invention, a secret is sensitive data that is not intended to be accessible to any entity except the corresponding client device (104). The secret may be, for example, a password. While only the client device is intended to access the secret, malicious entities may attempt to access the client device (104) and obtain the secret without the permission of an intended user of the client device (104). Because of this possibility, the client device, rather than storing the secret as is, may store an encrypted version of the secret (also referred to as the encrypted secret). The encrypted secret may not be decrypted without the aid of at least one escrow agent system (100A, 100B). In this manner, the secret, in its decrypted form, may not be accessed by the malicious entity via access only to the client device (104).

In one or more embodiments of the invention, the authorization service (102) is a trusted entity that includes functionality for providing authentication to the escrow agent systems (100) as requested by the client device (104). The authorization service (102) may obtain authentication requests that specify credentials for the client device (104). The credentials may be verified by the authorization service (102), and confirmation of the validity of the credentials may be provided to the escrow agent systems (100). The validity may be used to determine whether an encryption or a decryption is initiated by the escrow agent systems (100) in accordance with the methods of FIGS. 3A-3D. In this manner, a decryption of a secret stored in the client device (104) as initiated by a malicious entity may be prevented. While the system shown in FIG. 1 only includes a single authorization service, the system may be implemented using multiple authorization services without departing from the invention.

Figure 5:
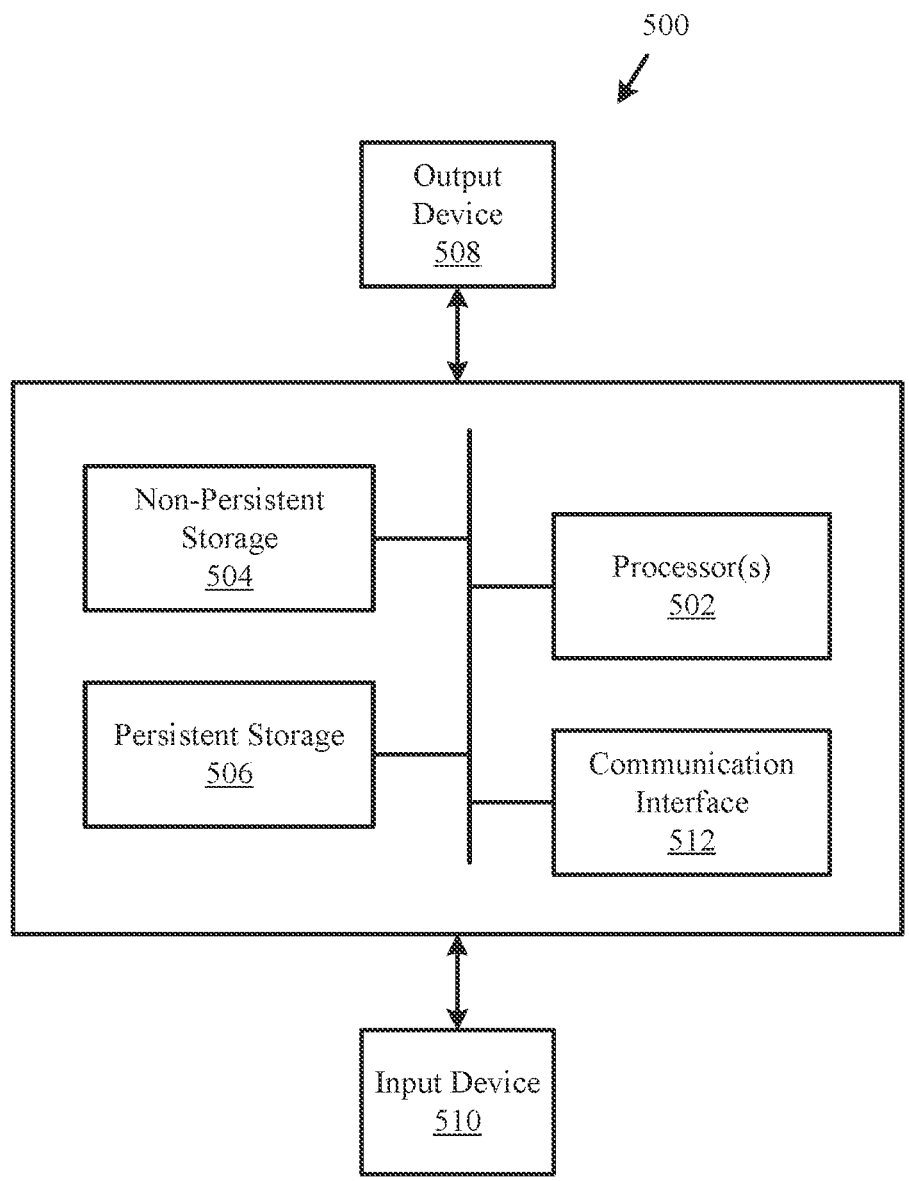
FIG. 5 shows a diagram of a computing device in accordance with one or more embodiments of the invention.

In one or more embodiments of the invention, the authorization service (102) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the authorization service (102) described throughout this application.

The authorization service (102) may be implemented as a logical device without departing from the invention. The logical device utilizes computing resources of any number of physical computing devices to provide the functionality of the authorization service (102) described throughout this application.

In one or more embodiments of the invention, the escrow agent systems (100) aid in the encryption and/or decryption of secrets as initiated by the client device (104). The escrow agent systems (100) may aid in the encryption of such secrets by generating pairing entries (further discussed in FIG. 2) that specify the process(es) for encrypting and/or decrypting secrets for a client device (104). Further, the escrow agent systems (100) may aid in the decryption of such secrets by implementing the pairing entries using obtained information from the client device (104). The escrow agents may perform the aforementioned aiding by performing the methods discussed in FIGS. 3A and 3C.

In one or more embodiments of the invention, each escrow agent system (100A, 100B) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the escrow agent system (100A, 100B) to perform the functionality of the escrow agent system (100A, 100B) described throughout this application and/or all, or a portion thereof, of the method illustrated in FIGS. 3A-3D.

Each escrow agent system (100A, 100B) may be implemented as a logical device without departing from the invention. The logical device utilizes computing resources of any number of physical computing devices to provide the functionality of the escrow agent system (100A, 100B) described throughout this application and/or all, or a portion thereof, of the method illustrated in FIGS. 3A-3D.

In one or more embodiments of the invention, the client device (104) utilizes the services of at least a portion of the escrow agent systems (100) to initiate encryption and storage of an encrypted secret. The encrypted secret may be stored in a client device storage (106). The client device (104), operated by a client (e.g., a user), may send secret encryption initiation requests to a set of the escrow agent systems (100) to initiate encryption of the secret in accordance with FIG. 3A. Further, to perform the decryption, the client device (104) may utilize at least a portion of the aforementioned set of escrow agent systems (100) in accordance with FIG. 3C.

In one or more embodiments of the invention, the encrypted secret may be an encrypted version of a secret generated by the client device (104) and intended to not be shared with any device outside of the client device (104) or the client device storage (106).

In one or more embodiments of the invention, the client device (104) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (104) described throughout this application and/or all, or a portion thereof, of the method illustrated in FIGS. 3A and 3C.

The client device (104) may be implemented as a logical device without departing from the invention. The logical device utilizes computing resources of any number of physical computing devices to provide the functionality of the client device (104) described throughout this application and/or all, or a portion thereof, of the method illustrated in FIGS. 3A and 3C.

While illustrated as a separate component from the client device (104), the client device storage (106) may be a component internal to the client device (104) without departing from the invention.

While the system of FIG. 1 only illustrates one client device (104) with one encrypted secret, multiple client devices may utilize the services of the escrow agent systems (100) without departing from the invention. In such embodiments in which the escrow agent systems (100) service multiple client devices, each client device may utilize a separate client device storage corresponding to the client device and not intended to be accessed by other entities in the system.

Figure 2:
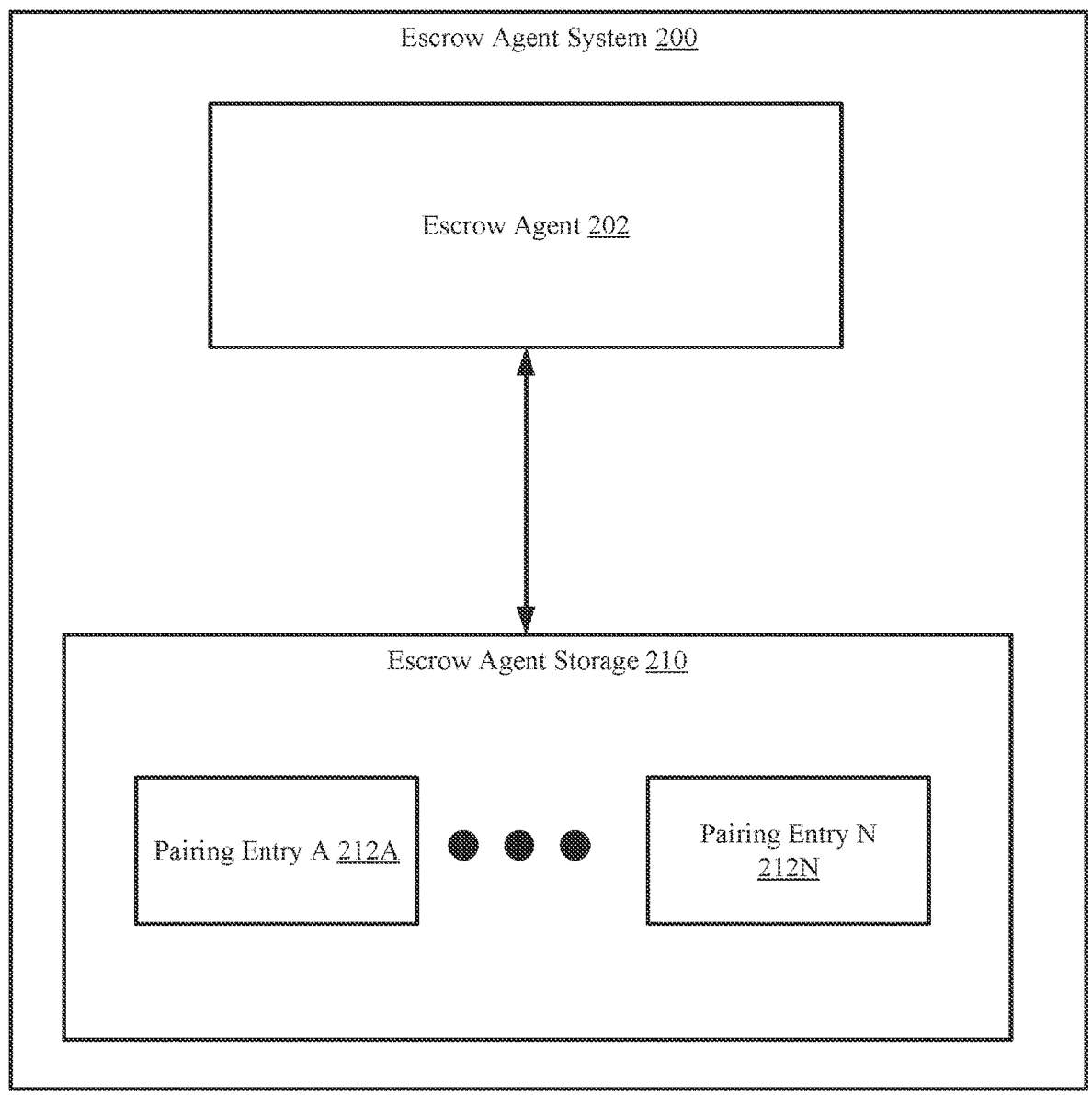
FIG. 2 shows a diagram of an escrow agent system in accordance with one or more embodiments of the invention.

FIG. 2 shows a diagram of an escrow agent system in accordance with one or more embodiments of the invention. The escrow agent system (200) may be an embodiment of an escrow agent system (100A, 100B) discussed above. As discussed above, the escrow agent system (200) includes functionality for aiding in the encryption and/or decryption of secrets as initiated by client devices. To perform the aforementioned functionality, the escrow agent system (200) includes an escrow agent (202) and an escrow agent storage (210). The escrow agent system (200) may include additional, fewer, and/or different components without departing from the invention.

In one or more embodiments of the invention, the escrow agent (202) aids in the encryption and/or decryption of at least a portion of secrets initiated by the client devices. The escrow agent (202) may perform the methods of FIGS. 3B and 3D to aid in the encryption and/or decryption of the secrets (or portions thereof).

In one or more embodiments of the invention, the escrow agent storage (210) is a storage device operatively connected to the escrow agent (202) that is not intended to be accessible by the client devices or by other escrow agents. The escrow agent storage (210) may store pairing entries (212A, 212N). In one or more embodiments of the invention, each pairing entry (212A, 212N) is a data structure associated with a client. The pairing entry may specify the client (e.g., via a client identifier), the encryption algorithm performed on the corresponding secret, and a private key to be used for decrypting the corresponding secret. The client identifier may be a combination of numbers, letters, and/or symbols that uniquely identify the client.

FIGS. 3A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3D may be performed in parallel with any other steps shown in FIGS. 3A-3D without departing from the scope of the invention.

Figure 3A:
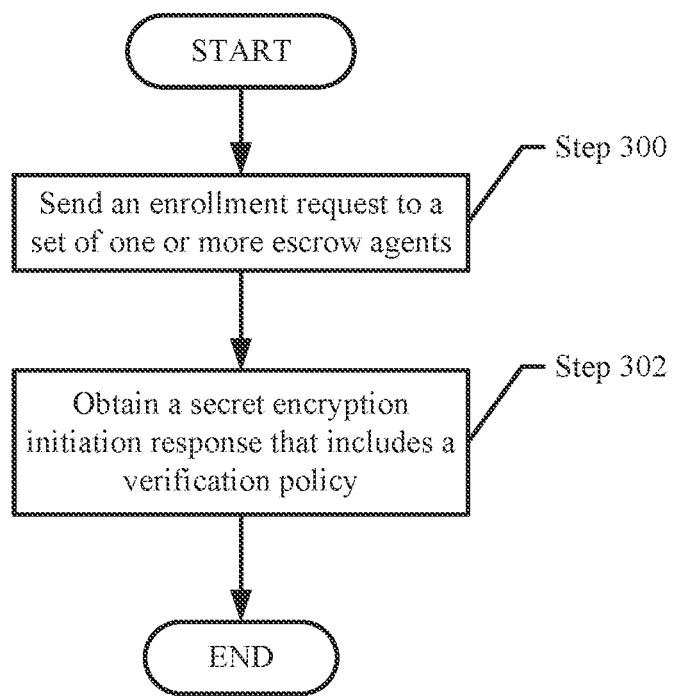
FIG. 3A shows a flowchart for initiating service with a set of escrow agents in accordance with one or more embodiments of the invention.

FIG. 3A shows a flowchart for initiating service with a set of escrow agents in accordance with one or more embodiments of the invention. The method shown in FIG. 3A may be performed by, for example, a client device (104, FIG. 1). Other components of the system illustrated in FIG. 1 may perform the method of FIG. 3A without departing from the invention.

Turning to FIG. 3A, in step 300, an enrollment request is sent to a set of one or more escrow agents. In one or more embodiments of the invention, the enrollment request may specify initiating an enrollment of the services provided by the escrow agent. The enrollment request may include credential information used by the escrow agent(s) to verify the identity of the user associated with the client. The credential information may be further provided by the authorization service. In this manner, the services of the escrow agents may be utilized for one or more secrets (e.g., as discussed in FIGS. 3A-3D).

In such embodiments in which the set includes multiple escrow agents, and the enrollment request is sent to each of the multiple escrow agents in the set. Each escrow agent may provide services for at least a portion of a secret (either currently generated or generated in the future).

In step 302, an enrollment response is obtained from each escrow agent in the set. In one or more embodiments of the invention, the enrollment response may include a public key from each escrow agent to be used by the client device (or a client operating the client device) when encrypting secrets. Further, the enrollment response may further specify the encryption algorithm to be performed on the secret (or corresponding portion of the secret). Examples of encryption algorithms include, but are not limited to: data encryption standard (DES), Triple DES, Rivest-Shamir-Adleman (RSA), Blowfish, and Advanced Encryption Standard (AES).

In one or more embodiments of the invention, the enrollment response further includes a verification policy. The verification policy may be a policy that specifies a schedule in which to perform verification tests on the corresponding escrow agent. The verification test may be a process of confirming that the escrow agent has not lost capability of decrypting a secret (or a portion thereof). The verification test may be based on whether the escrow agent continues to possess a decryption key (e.g., a private key corresponding to the client). The verification test may be performed in accordance with FIG. 3C.

Figure 3B:
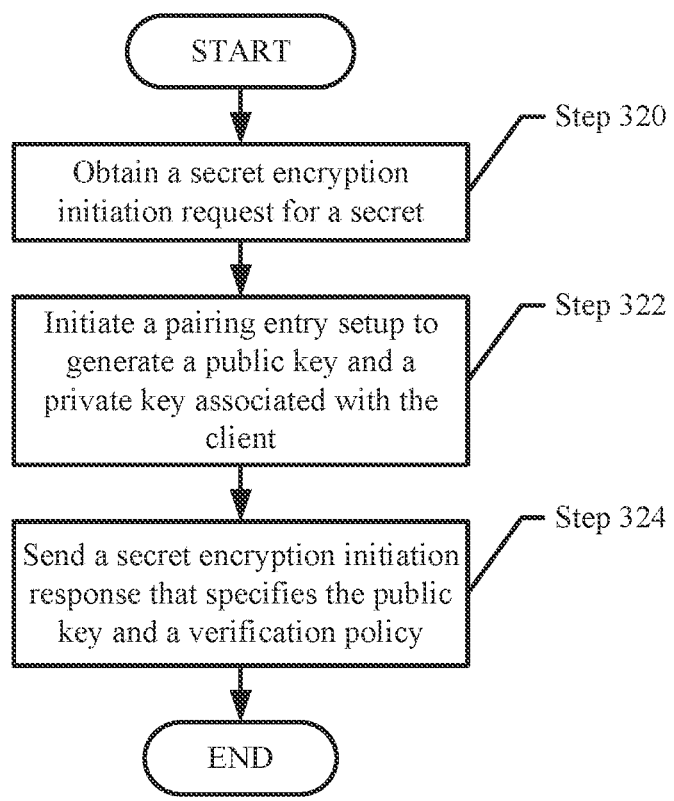
FIG. 3B shows a flowchart for servicing enrollment requests in accordance with one or more embodiments of the invention.

FIG. 3B shows a flowchart for servicing enrollment requests in accordance with one or more embodiments of the invention. The method shown in FIG. 3B may be performed by, for example, an escrow agent system (100A, 100B, FIG. 1). Other components of the system illustrated in FIG. 1 may perform the method of FIG. 3B without departing from the invention.

In step 320, an enrollment request is obtained for a secret (or a corresponding portion thereof). In one or more embodiments of the invention, the enrollment request is that of step 300 of FIG. 3A sent by the client device.

In step 322, a pairing entry setup is initiated to generate a public key and a private key associated with the client operating the client device. In one or more embodiments of the invention, the pairing entry is set up by generating a public key and a private key using a predetermined encryption algorithm. For example, the public key and the private key may be generated using a client identifier (e.g., using a hash function performed on the client identifier).

In one or more embodiments of the invention, the public key and private key may be unique to the client. The pairing entry may include the private key and the client identifier. Alternatively, the pairing entry may include information used by the escrow agent for generating the private key. For example, the pairing entry may include instructions for generating the private key by performing a hash function on the client identifier). The pairing entry may be stored in the escrow agent storage.

In step 324, an enrollment response that specifies the public key is sent to the client device. In one or more embodiments of the invention, the secret encryption initiation response may further include the encryption algorithm to be implemented on a secret (or corresponding portion thereof).

In one or more embodiments of the invention, the enrollment response further specifies the verification policy discussed in FIG. 3A. The schedule specified in the verification policy may be determined by the escrow agent, by the authorization service, and/or by any other entity without departing from the invention.

In one or more embodiments of the invention, at a later point in time following the enrollment process, the client device may generate a secret to be encrypted. The client device may encrypt the secret using the obtained public keys and using the specified encryption algorithm and store the encrypted secret in the client storage. In one or more embodiments of the invention, the secret encryption is performed by implementing the specified encryption algorithm, or a previously agreed-upon encryption algorithm, on the secret (or corresponding portions) using the obtained public key(s). In such embodiments in which the set of escrow agents is two or more, each public key may correspond to a portion of the secret. Specifically, the secret may be divided into N portions and encrypted using the corresponding public keys.

In one or more embodiments of the invention, to decrypt the secret, the encrypted secret may be obtained from the client device storage. A blinding operation may be performed on the encrypted secret to obtain a blinded encrypted secret. In one or more embodiments of the invention, a blinding operation is a process for altering the encrypted secret such that: (i) the encrypted secret may be still decrypted by the escrow agent, (ii) the blinding operation may be undone using an inverse operation after the secret has been decrypted, and (iii) the blinding operation may not be undone without blinding values used during the blinding operation. The blinding values are intended to be known only to the client. In this manner, only the client may undo the blinding operation (e.g., using an unblinding operation discussed below).

In one or more embodiments of the invention, the blinding operation may be any combination of mathematical operators performed on the encrypted secret using the blinding values such that, after the encrypted secret is decrypted, an inverse of the combination of mathematical operators may be performed on the decrypted secret using the blinding values to obtain the secret.

In one or more embodiments of the invention, the subset K of the escrow agents is a portion of the set of N escrow agents to which the secret encryption initiation requests were sent. In such embodiments in which multiple escrow agents are included in the set, and where each of the multiple escrow agents correspond to a portion of the secret, the subset is a minimum number of escrow agents (e.g., K) required to perform the decryption of a first fraction of the secret such that the remaining fraction of the secret may be calculated (or otherwise generated) using the first fraction.

In one or more embodiments of the invention, the process of calculating the secret using a first fraction of the secret may be implemented using, at least in part, a Shamir's secret sharing scheme. In one or more embodiments of the invention, the Shamir's secret sharing scheme includes dividing the secret into a first number of portions (e.g., N), distributing each portion to an entity (e.g., an escrow agent) in a set of entities, where a predetermined second number of portions (e.g., K) is sufficient to reconstruct the secret, where the second number is smaller than (or equal to) the first number. Other processes may be implemented to perform the calculation of the secret using a first fraction of the secret without departing from the invention.

In such embodiments in which the original set of escrow agents only includes one escrow agent, the one escrow agent may be included in the subset of escrow agent. Said another way, the entire blinded encrypted secret may be included in the secret decryption request sent to the one escrow agent.

Following the blinding operation performed on the secret, a secret decryption request is sent to each of at least the minimum number of the set of N escrow agents. The escrow agents may perform the method of FIG. 3D to perform the decryption on the blinded encrypted secret (or portion thereof) and send the blinded decrypted secret (or portion thereof) to the client device. An unblinding operation is performed to obtain the secret. In one or more embodiments of the invention, the unblinding operation may include performing a version of an inverse of the blinding operation that undoes the blinding performed on the encrypted secret prior to decryption. In this manner, the client device obtains a decrypted, unblinded secret. In such embodiments in which only a first fraction of the secret is obtained from the escrow agents, a reconstruction may be performed on the fraction of the secret to obtain the complete secret.

Figure 3C:
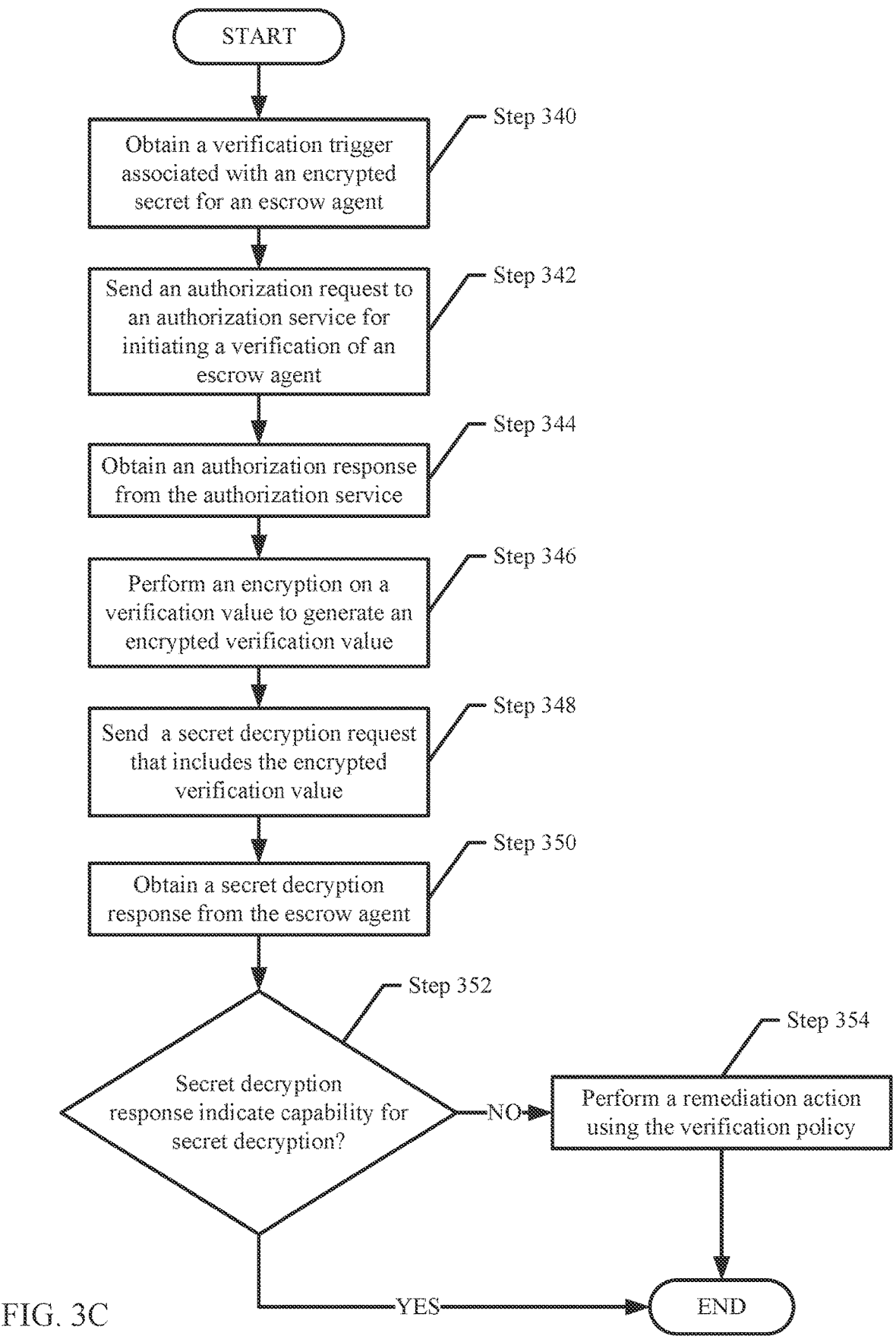
FIG. 3C shows a flowchart for performing a verification test on an escrow agent in accordance with one or more embodiments of the invention.

FIG. 3C shows a flowchart for performing a verification test on an escrow agent in accordance with one or more embodiments of the invention. The method shown in FIG. 3C may be performed by, for example, the client device (104, FIG. 1). Other components of the system illustrated in FIG. 1 may perform the method of FIG. 3C without departing from the invention.

In step 340, a verification trigger associated with an encrypted secret is obtained for an escrow agent. In one or more embodiments of the invention, the verification trigger may correspond to performing a verification test on an escrow agent. The verification trigger may be, for example, a notification by a user operating the client device that specifies initiating the verification test.

In step 342, an authorization request is sent to an authorization service for initiating a decryption of the encrypted secret. In one or more embodiments of the invention, the authorization request specifies the credential information of a user of the client. The credential information may be information intended to be known only to the user. The credential information may be used to verify the identity of the user prior to attempting to decrypt the stored encrypted secret.

In step 344, an authorization response is obtained from the authorization service. In one or more embodiments of the invention, the authorization response may specify whether the authorization service has confirmed the identity of the user, and whether the escrow agent(s) have received such confirmation.

Steps 346-354 may be performed only if the authorization service confirms the identity of the user. In such embodiments in which the identity is not confirmed using the credential information, a notification may be sent to the client device that specifies the failed confirmation of the identity of the user. The user may then perform remediation actions to attempt to confirm its identity. For example, the user may resend correct credential information, update the credential information, contact the authentication service to perform secondary authentication (e.g., using two-factor authentication). Other remediation actions may be performed to attempt to confirm the identity of the user.

In step 346, an encryption is performed on a verification value to generate an encrypted verification value. The verification value may be a value determined by the client device at any point in time prior to the encryption. For example, the verification value may be generated in response to the verification trigger, following the enrollment process, and/or at any other point without departing from the invention. The encryption performed on the verification value may be performed using the encryption algorithm discussed in FIG. 3A.

In step 348, a secret decryption request is sent to the escrow agent for decryption. The secret decryption request may include the encrypted verification value.

In step 350, a secret decryption response is obtained from each of the subset of escrow agents. In one or more embodiments of the invention, the secret decryption response includes a decrypted verification value. The decrypted verification value may be generated in accordance with FIG. 3D.

In such embodiments in which the escrow agent is unable to perform the decryption, the secret decryption response may specify such incapability of the escrow agent.

In step 352, a determination is made about whether the secret decryption response indicates capability for secret decryption by the escrow agent. In one or more embodiments of the invention, such determination may be performed by comparing the obtained decrypted verification value to the expected verification value and determining whether the verification values match. If the verification values match, it may be determined that the escrow agent is capable of secret decryption. If the secret decryption response indicates the escrow agent is capable, the method ends following step 352; otherwise, the method proceeds to step 354.

In step 354, a remediation action is performed using the verification policy. In one or more embodiments of the invention, following the determination that the escrow agent is not capable of performing the decryption, the client may identify a remediation action specified in the verification policy. A remediation may include, for example, decrypting the secret using a fraction of the secret (e.g., using K of the N escrow agents discussed above), re-generating the secret, re-enrolling with the escrow agent to obtain a new public key, and re-encrypting the secret using at least the new public key.

Alternatively, after re-generating the secret, the secret may be re-divided using a new portion of the N escrow agents that does not include the escrow agent that has lost capability (e.g., in case the client no longer trusts the escrow agent), and re-encrypting the secret using the new portion of the N escrow agents.

Figure 3D:
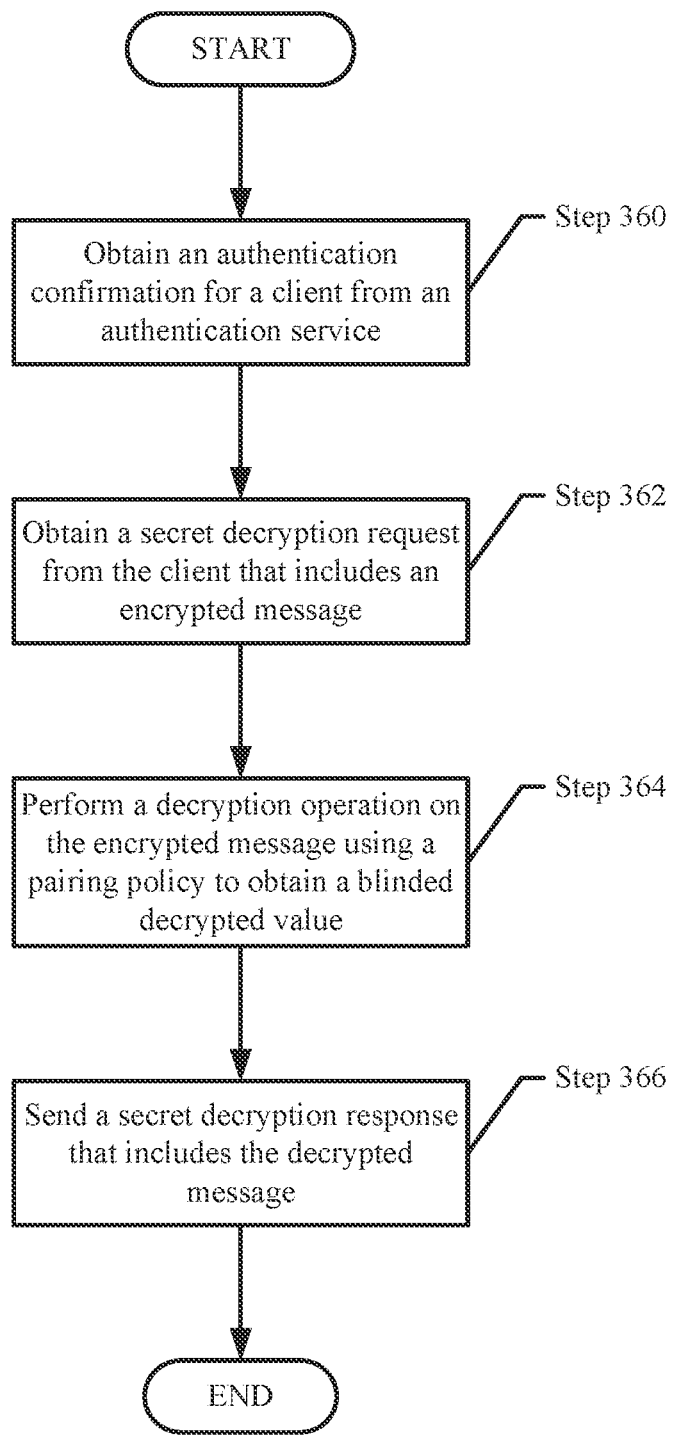
FIG. 3D shows a flowchart for servicing secret decryption requests in accordance with one or more embodiments of the invention.

FIG. 3D shows a flowchart for servicing secret decryption requests in accordance with one or more embodiments of the invention. The method shown in FIG. 3D may be performed by, for example, an escrow agent system (100A, 100B, FIG. 1). Other components of the system illustrated in FIG. 1 may perform the method of FIG. 3D without departing from the invention.

In step 360, an authorization confirmation for a client is obtained from an authentication service. In one or more embodiments of the invention, the authorization confirmation specifies that the identity of the client operating using the client device requesting to perform the secret decryption is verified and confirmed.

In step 362, a secret decryption request is obtained from the client. In one or more embodiments of the invention, the secret decryption request specifies decrypting a message using a private key corresponding to the client. The message may be at least one of: (i) a blinded encrypted secret, or (ii) an encrypted verification value. In one or more embodiments of the invention, the escrow agent is unable to tell whether the message included in the secret decryption request is (i) or (ii).

In step 364, a decryption operation is performed on the message using the pairing entry generated in FIG. 3A. In one or more embodiments of the invention, the obtained message is decrypted by obtaining the pairing entry associated with the client and performing a decryption on the message using the private key associated with the pairing entry.

In one or more embodiments of the invention, the escrow agent loses access to the private key prior to obtaining the secret decryption request. The escrow agent may lose such access by factors such as, for example, inadvertently deleting the private key, losing access to the escrow agent storage storing the private key, storing the pairing entry incorrectly, resulting in an incorrect private key, and/or the escrow agent becoming unavailable. Other factors may cause the escrow agent to lose capability of performing the decryption without departing from the invention.

In step 366, a secret decryption response is sent. The secret decryption response may include the decrypted message as generated in step 364.

In such embodiments in which the escrow agent is unable to perform the decryption, the secret decryption response may specify the incapability.

In one or more embodiments of the invention, following step 366, the escrow agent may store an entry that specifies the client and the specified timestamp. Such timestamp may be provided to the client device with the secret decryption response. In this manner, the escrow agent may track the most recent point in time in which the client has requested the services of the escrow agent. Such tracking may be used by the escrow agent to manage the activity (or lack thereof) of the clients enrolled in the services of the escrow agent. Such tracking may be used, for example, to manage the storage of the pairing entries. For example, pairing entries corresponding to inactive clients may be deleted after a period of time predetermined by the escrow agent.

While the steps of FIGS. 3A-3D describe methods for performing blinding and/or unblinding operations on encrypted or decrypted versions of the secret (or portions thereof) by sending such versions of the secret (or portions thereof) to and from the escrow agents, embodiments of the invention may include performing blinding and/or unblinding operations on keys (e.g., the public and/or private keys discussed above), and using such versions of the public and/or private keys to perform the encryption, decryption, blinding, and/or unblinding operations on the secret by the client device. Said another way, in one or more embodiments, the blinding and/or unblinding operations may be performed on the public keys rather than the secret, and rather than transmitting blinded, encrypted secrets between the client devices and the escrow agents, the blinded keys are transmitted such that an escrow agent may not directly decrypt the secret using the blinded key should the escrow agent, acting maliciously, gain access to the encrypted secret.

In such embodiments, the client device (e.g., 104, FIG. 1) sends encryption requests to each of the set of escrow agents (e.g., 100A, 100B, FIG. 1). The encryption requests may include a set of encryption values to be used by the escrow agents to prepare a public key-private key pair for the client. The private key may be stored by the escrow agent and the public key may be provided to the client device. The public key, obtained by the client device, may be combined with additional unshared values to generate an encryption key. The encryption key may be used to encrypt the secret by the client device, and the encrypted secret may be stored in the client device storage. The client device may further store the encrypted secret and enough information (e.g., an additional key) to recreate the encryption key with the aid of the escrow agent. The encryption key may be deleted or otherwise removed from the client device's access. If the client device is using a set of multiple escrow agents, each escrow agent may be associated with the same or different encryption keys without departing from the invention.

During decryption, the client device may first validate the identity of the client using the authorization service (e.g., 102, FIG. 1), perform a blinding operation on each additional key using a blinding value unknown to the escrow agent, and send the blinded encryption key to the escrow agent. The escrow agent may perform a blinded decryption on the additional key to obtain a blinded decryption key and send the blinded decryption key to the client device. The client device may perform an unblinding operation on the blinded decryption key to generate a decryption key to be used to decrypt the encrypted secret by the client device.

In one or more embodiments of the invention, the blinding operation and encryption discussed above are performed in conjunction, at least in part, using an encryption algorithm based on a Diffie-Hellman protocol. The following is a non-limiting example of the Diffie-Hellman protocol performed on a secret S during encryption.

Consider a scenario in which a client device (C) is performing a blinding operation in conjunction with an Escrow Agent (EA).

Step 1: C and EA agree on a publicly accessible prime modulus p and base g.

Step 2. EA chooses a private number (B_C) which corresponds to C but is not accessible by C. (B_C) is stored in the escrow agent storage.

Step 3. EA computes $g^{(B\_C)}$ mod p and sends it to C.

Step 4. C chooses a private random number A which will be discarded after step 5.

Step 5. C computes $g^{A(B\_C)}$ mod p and hashes it to generate an encryption key. In one embodiment of the invention, hashing is only necessary to ensure the encryption key will conform to encryption standards and, as such, may not be used in all implementations of the invention.

Step 6. C performs an encryption on the secret S using the hash of $g^{A(B\_C)}$ mod p as a key to generate the encrypted secret $S_{enc}$, and stores the blinded encrypted secret $S_{enc}$, the value $g^A$ mod p, and the value $g^{B\_C}$ mod p, the latter of which is used for verification.

At a later point in time, C desires to decrypt the encrypted secret $S_{enc}$. The following is a non-limiting example of the encryption algorithm based on the Diffie-Hellman protocol performed on the encrypted secret $S_{enc}$ during decryption.

Step 7: C chooses a random number z.

Step 8: C retrieves $g^A$ mod p and computes $g^{Az}$ mod p.

Step 9: C sends $g^{Az}$ mod p to EA.

Step 10: EA retrieves or recomputes (B_C) and computes $g^{A(B\_C)}$ mod p.

Step 11: EA sends $g^{Az(B\_C)}$ mod p to C.

Step 12: C calculates z' such that $g^{zz'}=1$ mod p and raises $g^{Az(B\_C)}$ by z' to obtain $g^{A(B\_C)}$ mod p.

Step 13: C can now hash $g^{A(B\_C)}$ mod p, and use the output of the hash as the key to perform a decryption operation on $S_{enc}$ to obtain S.

In such embodiments in which the blinding operation and encryption discussed above are performed in conjunction using the Diffie-Hellman encryption algorithm (e.g., by performing steps 1-13), the verification test performed by the client may include performing a variation of the encryption algorithm based on the Diffie-Hellman protocol. The following is a non-limiting example of the variation of the encryption algorithm based on the Diffie-Hellman protocol performed on a verification value t during a verification test.

Consider a scenario in which a client device (C) is performing a verification test on an Escrow Agent (EA). C may generate a testing value $g^t$ mod p and a comparison value $g^{t(B\_C)}$ mod p using the obtained and stored $g^{(B\_C)}$ mod p. C may then send the testing value $g^t$ mod p to EA. The comparison value $g^{t(B\_C)}$ mod p may be kept to be used for comparison with a value obtained from EA. EA sends back a secret decryption response. Assuming EA still includes the private key (B_C), EA should be capable of re-generating $g^{t(B\_C)}$ mod p using $g^t$ mod p and (B_C). If EA still possesses such capability, EA may respond with $g^{t(B\_C)}$ mod p. Based on the secret decryption response, C determines the capability of EA. Specifically, the value returned by EA in the secret decryption response is compared to the expected comparison value $g^{t(B\_C)}$ mod p, and the determination is based on whether the returned value matches the expected comparison value. Such determination may affect whether a remediation action is required (as discussed in step 354 of FIG. 3C).

Example

Figure 4A:
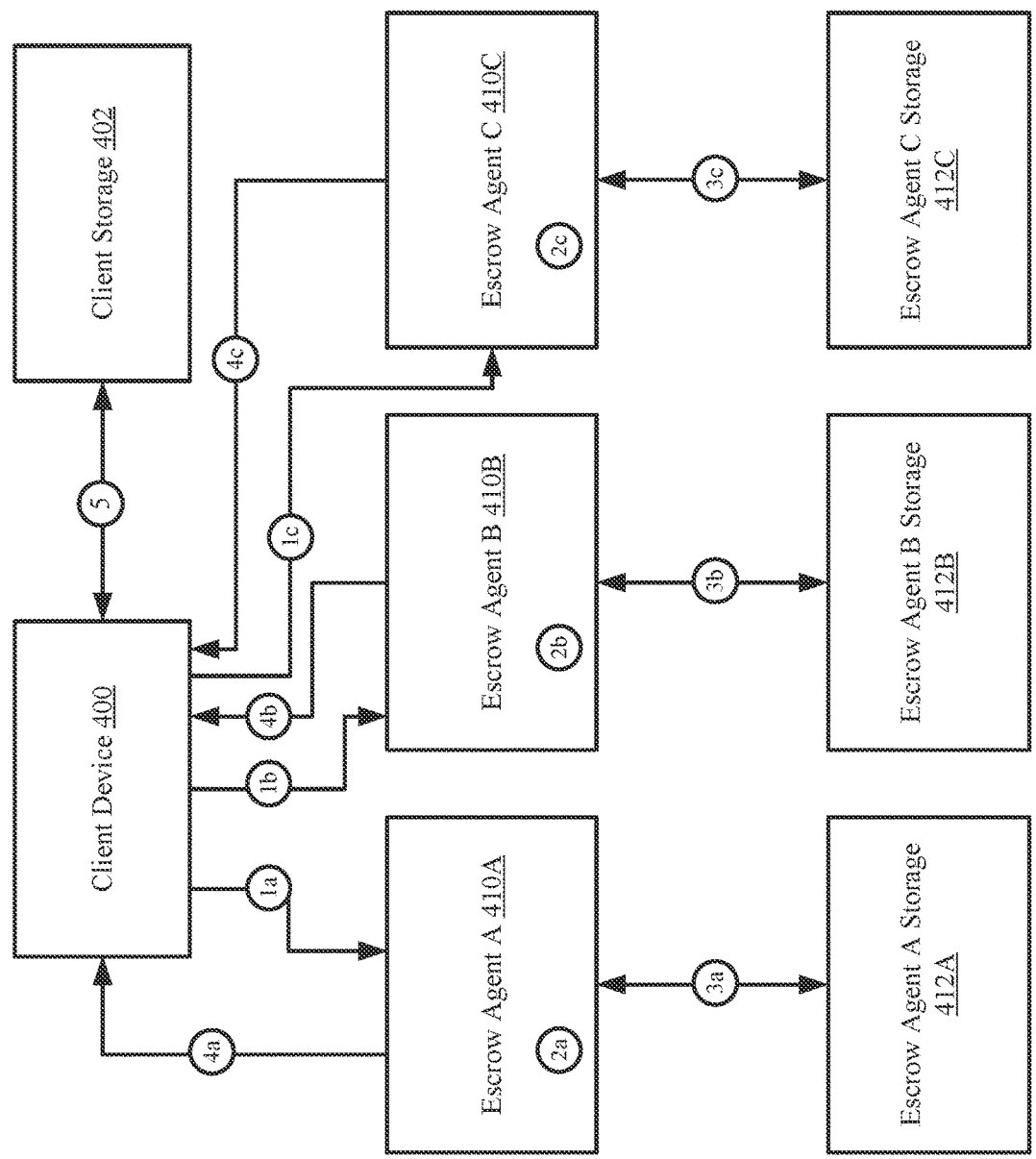
FIGS. 4A-4B show an example in accordance with one or more embodiments of the invention.
Figure 4B:
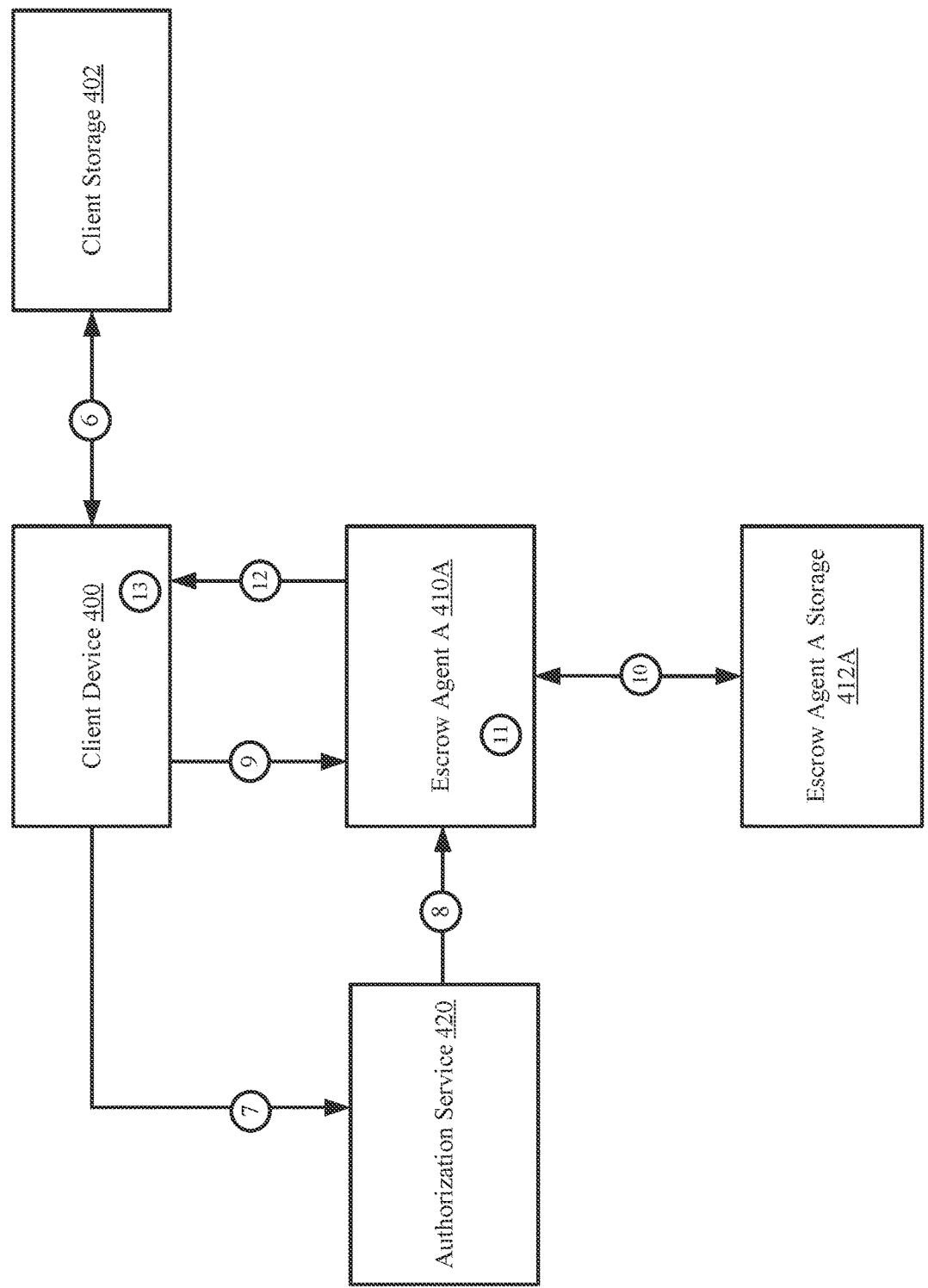

The following section describes an example. The example, illustrated in FIGS. 4A-4B, is not intended to limit the invention. Actions performed by components of the illustrated system are illustrated by numbered, circular boxes interconnected, in part, using arrows, and described in this application using numbered brackets.

Turning to the example, consider a scenario in which a client device would like to store an encrypted secret to prevent a malicious entity from accessing the secret should the malicious entity gain access to the client device.

FIG. 4A shows a diagram of an example system in accordance with one or more embodiments of the invention. The example system includes a client device (400), a client storage (402), and three escrow agents (410A, 410B, 410C), each with a corresponding escrow agent storage (412A, 412B, 412C). For the sake of brevity, not all components of the example system are illustrated in FIG. 4A.

The client device, after having generated the secret, divides the secret into three portions, and sends a secret encryption initiation request to each escrow agent (410A, 410B, 410C) that specifies providing a public key to the client device (400) for one of the portions [1a, 1b, 1c].

Each escrow agent (410A, 410B, 410C), in response to obtaining the respective secret encryption initiation request, generates a public key and a private key using a random generation tool [2a, 2b, 2c].

Each private key is stored with a client identifier as a pairing entry in the corresponding escrow agent storage (412A, 412B, 412C) [3a, 3b, 3c]. Further, the public keys are provided to the client device (400) as a secret encryption initiation response [4a, 4b, 4c]. Further, a verification policy is provided by each escrow agent (410A, 410B, 410C) that specifies a frequency in which the escrow agents are to be verified to ensure a capability of decrypting the corresponding portion of the encrypted secret. For escrow agent A (410A), the verification policy specifies a frequency of once every two months; for escrow agent B (410B), the verification policy specifies once every year; and for escrow agent C (410C), the verification policy specifies once every six months.

The client device (400) encrypts the portions of the generated secret using the obtained public keys. The encrypted secret is stored in the client storage (402) along with the public keys and verification polices of each escrow agent (410A, 410B, 410C) [5].

Referring to FIG. 4B, FIG. 4B shows a second diagram of the example system at a later point in time. FIG. 4B further illustrates an authorization service (420) used to validate any requests for decryption (either via secret decryption requests or verification tests). At a later point in time (i.e., two months after the encrypted portions of the secret are stored), the client determines, based on the verification policy, that a verification test is warranted at this time for escrow agent A (410A).

The client device (400) obtains the public key for escrow agent A (410A) from the client storage (402) [6]. The client then sends an authentication request to the authorization service (420) that specifies the credentials for the user of the client device (400) [7]. The authorization service (420), in response to the authorization request, analyzes the credentials and confirms the identity of the user. The authorization service (420) transmits an authorization response to escrow agent A (410A) [8].

After the client device (400) has been authorized to initiate a decryption with the escrow agent, the client device (400) initiates an encryption of a verification value using the obtained public key to generate an encrypted verification value. The client device (400) provides the encrypted verification value to the escrow agent (410A) as a secret decryption request [9].

The escrow agent, in response to the secret decryption request (and unable to recognize that the secret decryption request is actually a verification test), obtains the pairing entry from the escrow agent storage (412) to determine that the private key is required to service the secret decryption request [10]. The escrow agent uses the private key to decrypt the encrypted verification value, which generates a decrypted verification value [11]. The decrypted verification value is provided to the client device (400) in addition to a timestamp of the decryption signed using the private key [12].

The client device (400), in response to obtaining the decrypted verification value, compares the obtained decrypted verification value to the verification value generated prior to encryption and determines that they are a match [13]. Based on the determination, the client device (400) continues to utilize the service of escrow agent A (410A) for decrypting the corresponding portion of the encrypted secret in the future, at least until the next verification test is performed.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices in a distributed environment. More specifically, embodiments of the invention improve a system that protects the privacy of stored data in the event of a malicious attack.

In current implementations, there are mechanisms for performing encryption on data using public keys and private keys generated by the entity requesting to perform the encryption. Embodiments of the invention utilize escrow agent(s) that generate the public keys and private keys, which enable the querying device to perform the encryption without performing the decryption. By preventing the querying device (e.g., a client device) from being able to decrypt the stored data (e.g., a secret) without the aid of the escrow agent(s), malicious entities accessing the querying device are prevented from accessing the data.

Embodiments of the invention further utilize multiple escrow agents to perform the protection of one secret such that no one escrow agent may include functionality for decrypting an entire secret. This may prevent malicious entities attacking one of the escrow agents from accessing the secret. As an added level of protection, any secret (or portion thereof) obtained by an escrow agent may be further modified by a blinding operation that prevents the escrow agent from accessing the decrypted secret without the blinding values, which are not shared with the escrow agent by the querying device.

Embodiments of the invention further provide security in ensuring that escrow agents have the capability to decrypt secrets before a secret encryption is even necessary. Because a secret decryption may not be necessary for large periods of times (e.g., several years), embodiments of the invention provide clients a method to periodically check in on the escrow agents before then and without actually sending the encrypted secret during the periodic check-ins (blinded or otherwise). Because both verification tests and secret decryption requests request a decryption of an unknown value, the escrow agents may be placed in a position to not be able to distinguish between a verification test and a secret decryption request.

Additionally, because escrow agents may have an incentive to ensure that the clients are still active, embodiments of the invention enable the escrow agents to track the frequency of service use by each clients by storing entries that are used to track the most recent secret decryption request obtained by a client.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A method for verifying by a client operatively connected to an escrow agent, a secret decryption of the escrow agent, the method comprising:
   initiating enrollment of the client with the escrow agent, wherein the enrollment results in the escrow agent generating a key pair comprising a public key and a private key;
   obtaining by the client, the public key from the escrow agent, wherein the private key is not shared with the client;
   encrypting by the client, a secret with the public key to obtain an encrypted secret;
   after encrypting the secret, encrypting, based on a verification trigger, a verification value using the public key to obtain an encrypted verification value;
   sending by the client, the encrypted verification value to the escrow agent;
   obtaining by the client, a secret decryption response from the escrow agent;
   making a determination by the client, based on the secret decryption response, that the escrow agent is not capable of decrypting the secret; and
   based on the determination, performing a remediation action.

2. The method of claim 1, further comprising:
   after encrypting the secret:
      authenticating, by the client, to the escrow agent, and, upon successful authentication, sending the encrypted verification value to the escrow agent for decryption, wherein the escrow agent fails to decrypt the encrypted verification value using a private key to obtain the verification value; and
      wherein the secret decryption response specifies failure of the escrow agent to decrypt the encrypted verification value.

3. The method of claim 1, wherein the verification trigger is based on a verification policy, and wherein the verification policy specifies performing a periodic verification of the escrow agent.

4. The method of claim 3, wherein the verification policy is obtained from the escrow agent with the public key.

5. The method of claim 1, wherein encrypting the secret with the public key to obtain the encrypted secret comprising:
   dividing the secret into N portions, wherein N is greater than or equal to 2,
   encrypting a first portion of the N portions with the public key to obtain a first encrypted portion,
   encrypting a second portion of the N portions with a second public key associated with a second escrow agent to obtain a second encrypted portion; and
   storing the first encrypted portion and the second encrypted portion on the client.

6. The method of claim 5, further comprising:
   sending at least K encrypted portions to K escrow agents, wherein the escrow agent is one of the at least K escrow agents, wherein K is less than or equal to N;
   obtaining K portions from the K escrow agents; and
   generating the secret using the K portions.

7. The method of claim 5, wherein the remediation action comprises:
   sending the second encrypted portion of the N portions to the second escrow agent;
   obtaining the second portion from the second escrow agent;
   generating the secret using the second portion;
   identifying a third escrow agent; and
   based on the identifying, re-encrypting the secret with a third public key obtained from the third escrow agent.

8. A method for verifying by a client operatively connected to an escrow agent, a secret decryption of the escrow agent, the method comprising:
   initiating enrollment of the client with the escrow agent, wherein the enrollment results in the escrow agent and the client establishing a base value (g) and prime modulus value (p), and wherein the escrow agent generates a private number (B_C) that is associated with the client but is not accessible to the client;

obtaining a public key from the escrow agent, wherein the public key is derived from g, p, and B_C;

generating an encryption key using the public key and a private random number A, wherein A is not accessible to the escrow agent;

encrypting a secret using the encryption key to obtain an encrypted secret;

storing the encrypted secret, the public key;

after storing the public key, generating a testing value using a verification value t;

generating a comparison value using the testing value and the public key;

sending the testing value to the escrow agent;

obtaining a secret decryption response from the escrow agent;

making a determination, based on the secret decryption response, that the escrow agent is not capable of decrypting the secret; and based on the determination, performing a remediation action, wherein the determination is based on a comparison between a returned value specified in the secret decryption response and the comparison value.

9. The method of claim 8, further comprising:
after encrypting the secret:
authenticating, by the client, to the escrow agent, and, upon successful authentication, sending an encrypted verification value to the escrow agent for decryption, wherein the escrow agent fails to decrypt the encrypted verification value using a private key to obtain the verification value; and
wherein the secret decryption response specifies failure of the escrow agent to decrypt the encrypted verification value.

10. The method of claim 8, further comprising:
generating an additional value derived from g, p, and the private random number A; and
storing the additional value,
wherein A is deleted after the encryption key is generated.

11. The method of claim 8, further comprising:
a verification policy, that specifies performing a periodic verification of the escrow agent.

12. The method of claim 11, wherein the verification policy is obtained from the escrow agent with the public key.

13. The method of claim 8, wherein generating the encryption secret further comprises using a hash function.

14. A non-transitory computer readable medium comprising computer readable program code, which when executed by a computer processor enables the computer processor to perform a method for verifying by a client operatively connected to an escrow agent, a secret decryption of the escrow agent, the method comprising:
initiating enrollment of the client with the escrow agent, wherein the enrollment results in the escrow agent generating a key pair comprising a public key and a private key;
obtaining by the client, the public key from the escrow agent, wherein the private key is not shared with the client;
encrypting by the client, a secret with the public key to obtain an encrypted secret;

after encrypting the secret, encrypting, based on a verification trigger, a verification value using the public key to obtain an encrypted verification value;

sending by the client, the encrypted verification value to the escrow agent;

obtaining by the client, a secret decryption response from the escrow agent;

making a determination by the client, based on the secret decryption response, that the escrow agent is not capable of decrypting the secret; and based on the determination, performing a remediation action.

15. The non-transitory computer readable medium of claim 14, the method further comprising:
after encrypting the secret:
authenticating the client, upon successful authentication, sending the encrypted verification value to the escrow agent for decryption, wherein the escrow agent fails to decrypt the encrypted verification value using a private key to obtain the secret; and
wherein the secret decryption response specifies failure of the escrow agent to decrypt the encrypted verification value.

16. The non-transitory computer readable medium of claim 14, wherein the verification trigger is based on a verification policy, and wherein the verification policy specifies performing a periodic verification of the escrow agent.

17. The non-transitory computer readable medium of claim 16, wherein the verification policy is obtained from the escrow agent with the public key.

18. The non-transitory computer readable medium of claim 14, wherein encrypting the secret with the public key to obtain the encrypted secret comprising:
dividing the secret into N portions, wherein N is greater than or equal to 2,
encrypting a first portion of the N portions with the public key to obtain a first encrypted portion,
encrypting a second portion of the N portions with a second public key associated with a second escrow agent to obtain a second encrypted portion; and
storing the first encrypted portion and the second encrypted portion on the client.

19. The non-transitory computer readable medium of claim 18, the method further comprising:
sending at least K encrypted portions to K escrow agents, wherein the escrow agent is one of the at least K escrow agents, wherein K is less than or equal to N;
obtaining K portions from the K escrow agents; and
generating the secret using the K portions.

20. The non-transitory computer readable medium of claim 19, wherein the remediation action comprises:
sending the second encrypted portion of the N portions to the second escrow agent;
obtaining the second portion from the second escrow agent;
generating the secret using the second portion;
identifying a third escrow agent; and
based on the identifying, re-encrypting the secret with a third public key obtained from the third escrow agent.

* * * * *